US010628291B2

(12) United States Patent
Chau et al.

(10) Patent No.: US 10,628,291 B2
(45) Date of Patent: *Apr. 21, 2020

(54) PROGRAMMING ASSISTANCE TO IDENTIFY SUBOPTIMAL PERFORMING CODE AND SUGGESTING ALTERNATIVES

(71) Applicant: International Business Machines Corporation, Armonk, NY (US)

(72) Inventors: Kwan Yin Andrew Chau, Parramatta (AU); Smitha Lal, Cheltenham (AU); Stephen Pham, Cabramatta (AU)

(73) Assignee: International Businees Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,735

(22) Filed: Aug. 20, 2018

(65) Prior Publication Data

US 2018/0357153 A1 Dec. 13, 2018

Related U.S. Application Data

(63) Continuation of application No. 15/412,053, filed on Jan. 23, 2017, now Pat. No. 10,055,335.

(51) Int. Cl.
| *G06F 9/44* | (2018.01) |
| *G06F 11/36* | (2006.01) |
| *G06F 8/41* | (2018.01) |
| *G06F 9/451* | (2018.01) |
| *G06F 40/14* | (2020.01) |
| *G06F 8/38* | (2018.01) |

(52) U.S. Cl.
CPC .......... *G06F 11/3664* (2013.01); *G06F 8/433* (2013.01); *G06F 9/451* (2018.02); *G06F 40/14* (2020.01); *G06F 8/38* (2013.01)

(58) Field of Classification Search
CPC . G06F 11/3664; G06F 11/3656; G06F 11/366
USPC .................................................. 717/120–128
See application file for complete search history.

(56) References Cited

U.S. PATENT DOCUMENTS

| 5,179,702 | A | | 1/1993 | Spix et al. | |
| 6,002,871 | A | * | 12/1999 | Duggan | G06F 11/3664 |
| | | | | | 714/38.12 |
| 6,185,701 | B1 | * | 2/2001 | Marullo | G06F 16/958 |
| | | | | | 714/38.14 |
| 6,701,514 | B1 | * | 3/2004 | Haswell | G06F 11/3664 |
| | | | | | 707/999.102 |
| 6,959,268 | B1 | * | 10/2005 | Myers, Jr. | G06Q 10/10 |
| | | | | | 703/6 |

(Continued)

OTHER PUBLICATIONS

Kung et al, "An Object-Oriented Web Test Model for Testing Web Applications", IEEE, pp. 111-120 (Year: 2000).*

(Continued)

*Primary Examiner* — Anil Khatri
(74) *Attorney, Agent, or Firm* — Yee & Associates, P.C.

(57) ABSTRACT

A method, apparatus, and computer program product to improve testing of web interfaces where each page and point of interaction in the web interfaces are represented by Page Objects. Responsive to a processor receiving code to navigate a path from a first Page Object to a second Page Object in the user interface, the path is identified as a slow path. Responsive to identifying the path as a slow path, a marker is displayed with the code.

19 Claims, 7 Drawing Sheets

(56) References Cited

U.S. PATENT DOCUMENTS

| | | | | |
|---|---|---|---|---|
| 7,117,504 B2* | 10/2006 | Smith | ............... | G06F 8/20 719/328 |
| 7,231,606 B2* | 6/2007 | Miller | ............... | H04L 43/50 702/186 |
| 7,330,887 B1* | 2/2008 | Dharmadhikari | ... | G06F 11/3419 709/224 |
| 7,849,447 B1* | 12/2010 | Karis | ............... | G06F 11/3672 714/100 |
| 7,979,849 B2* | 7/2011 | Feldstein | ............... | G06F 11/3692 714/39 |
| 8,146,059 B2 | 3/2012 | Ponsford et al. | | |
| 8,185,877 B1* | 5/2012 | Colcord | ............... | G06F 9/44 717/124 |
| 8,196,112 B1* | 6/2012 | Cansizlar | ............... | G06F 16/9577 717/126 |
| 8,572,560 B2 | 10/2013 | Drissi et al. | | |
| 8,627,288 B2 | 1/2014 | Kimball et al. | | |
| 8,761,659 B1* | 6/2014 | Lebrun | ............... | G09B 7/00 434/362 |
| 8,788,885 B1* | 7/2014 | Cook | ............... | G06F 11/3664 714/38.1 |
| 8,943,473 B1 | 1/2015 | Duraisamy et al. | | |
| 9,152,731 B2 | 10/2015 | Hu et al. | | |
| 9,154,611 B1* | 10/2015 | Jackson | ............... | H04W 4/029 |
| 9,298,590 B2 | 3/2016 | Kim | | |
| 9,383,973 B2 | 7/2016 | Villar et al. | | |
| 9,424,167 B2 | 8/2016 | Lee et al. | | |
| 9,612,807 B2 | 4/2017 | de Lima Ottoni | | |
| 9,803,423 B2 | 10/2017 | Lauterjung et al. | | |
| 9,990,110 B1* | 6/2018 | Lounibos | ............... | G06F 3/0484 |
| 10,387,029 B2* | 8/2019 | Butcher | ............... | G06F 3/0482 |
| 10,489,286 B2* | 11/2019 | Miller | ............... | G06F 11/3696 |
| 2016/0117150 A1 | 4/2016 | Kizhakkevalappil et al. | | |

OTHER PUBLICATIONS

Di Lucca et al, "Testing Web Applications", IEEE, pp. 310-319 (Year: 2002).*

Barenboim et al, "Hierarchical Composable Optimization of Web Pages", ACM, pp. 53-62 (Year: 2012).*

Liu et al, "Structural Testing of Web Applications", IEEE, pp. 84-96 (Year: 2000).*

Mesbah et al, "Crawling AJAX by Inferring User Interface State Changes", IEEE, pp. 122-134 (Year: 2008).*

Halfond et al, "Improving Test Case Generation for Web Applications Using Automated Interface Discovery", ACM, pp. 145-154 (Year: 2007).*

Jensen et al, "Server Interface Descriptions for Automated Testing of JavaScript Web Applications", ACM, pp. 510-520 (Year: 2013).*

Bezemer et al, "Automated Security Testing of Web Widget Interactions", ACM, pp. 81-90 (Year: 2009).*

Halfond et al., "Automated Identification of Parameter Mismatches in Web Applications," Proceedings of the 16th ACM SIGSOFT International Symposium on Foundations of Software Engineering, Atlanta, Georgia, Nov. 9-14, 2008, pp. 181-191.

Bolin et al., "Automation and Customization of Rendered Web Pages," Proceedings of the 18th Annual ACM Symposium on User Interface Software and Technology, Seattle, Washington, Oct. 23-26, 2005, pp. 163-172.

Haubl et al., "Deriving Code Coverage Information from Profiling Data Recorded for a Trace-based Just-in-time Compiler," Proceedings of the 2013 International Conference on Principles and Practices of Programming on the Java Platform: Virtual Machines, Languages, and Tools, Sep. 2013, 12 pages.

Sun et al., "Finding Compiler Bugs via Live Code Mutation," 2016 ACM SIGPLAN International Conference, Oct. 2016, pp. 849-963.

Sathyanathan et al., "Incremental Whole Program Optimization and Compilation," 2017 IEEE/ACM International Symposium on Code Generation and Optimization (CGO), Feb. 2017, pp. 221-232.

Hauptmann et al., "Utilizing User Interface Models for Automated Instantiation and Execution of System Tests,", Proceedings of the First International Workshop on End-to-End Test Script Engineering, Toronto, Ontario, Canada, Jul. 17-17, 2011, pp. 8-15.

Pradel et al., "EventBreak: Analyzing the Responsiveness of User Interfaces through Performance-Guided Test Generation," Proceedings of the 2014 ACM International Conference on Object Oriented Programming Systems Languages & Applications, 2014, pp. 33-47.

* cited by examiner

PROGRAMMING ASSISTANCE TO IDENTIFY SUBOPTIMAL PERFORMING CODE AND SUGGESTING ALTERNATIVES

CROSS-REFERENCE TO RELATED APPLICATION(S)

This application is a continuation of U.S. patent application Ser. No. 15/412,053, filing date Jan. 23, 2017, the entire contents of which are incorporated herein by reference.

BACKGROUND

1. Field

The disclosure relates generally to methods and systems for automated testing of web applications in an Integrated Development Environment. More particularly, the invention concerns assisting software developers to avoid inefficient navigation through a web page interface during testing.

2. Description of the Related Art

In order to test a web page, the programmer must refer to elements within a web page by clicking on links in the web page to determine what is displayed. Thus, navigation may require clicking links not only between pages, but within areas of user interaction within each page. The process of referring to elements within the web page by clicking on links may be automated.

One way in which the process may be automated is by modelling each area of interaction on the web page as a Page Object within the test code. Using Page Objects, a programmer writing code to cause navigation from one Page Object to another Page Object, will have a start point at a first Page Object and an end point at the second Page Object. While the start point and the end point are fixed, the paths between the two points are not.

In software applications, code may be written for multiple execution paths to achieve the same goal. For example, in a hierarchical repository, code can be written so that a user can navigate to a specific item by traversing the hierarchy or by using a view that lists all items of a certain type containing the item. Likewise, in the area of automated testing of a web page interface, a programmer can write code so that navigation between the same start point and end point may be effected over a number of different paths.

In order to navigate through a web page interface in an automated test, programmers may write a number of call methods. A group of call methods is a call chain. Call chains may provide navigation through the web pages and the areas of user interaction within the various web pages. The speed of the call chain depends on the execution time of each of the call methods in the call chain. Different call methods between the same start point and the same end point may be available, each having a different execution speed. Thus, writing one or more slow call methods may result in a test taking longer than desired. Therefore a need exists for a method and apparatus to assist programmers to write efficient code for navigation of web user interfaces in an automated testing application.

SUMMARY

According to one illustrative embodiment, a computer-implemented method for improving testing of web interfaces is provided. Each page and point of interaction in the web interfaces being tested are represented by page objects. A path is identified as a slow path in response to receiving code to navigate a path from a first page object to a second page object in a user interface by a processor. A marker is displayed with the code in response to identifying the path as a slow path. According to other illustrative embodiments, a computer system and computer program product for improving testing of web interfaces is provided.

DETAILED DESCRIPTION

Figure 1:
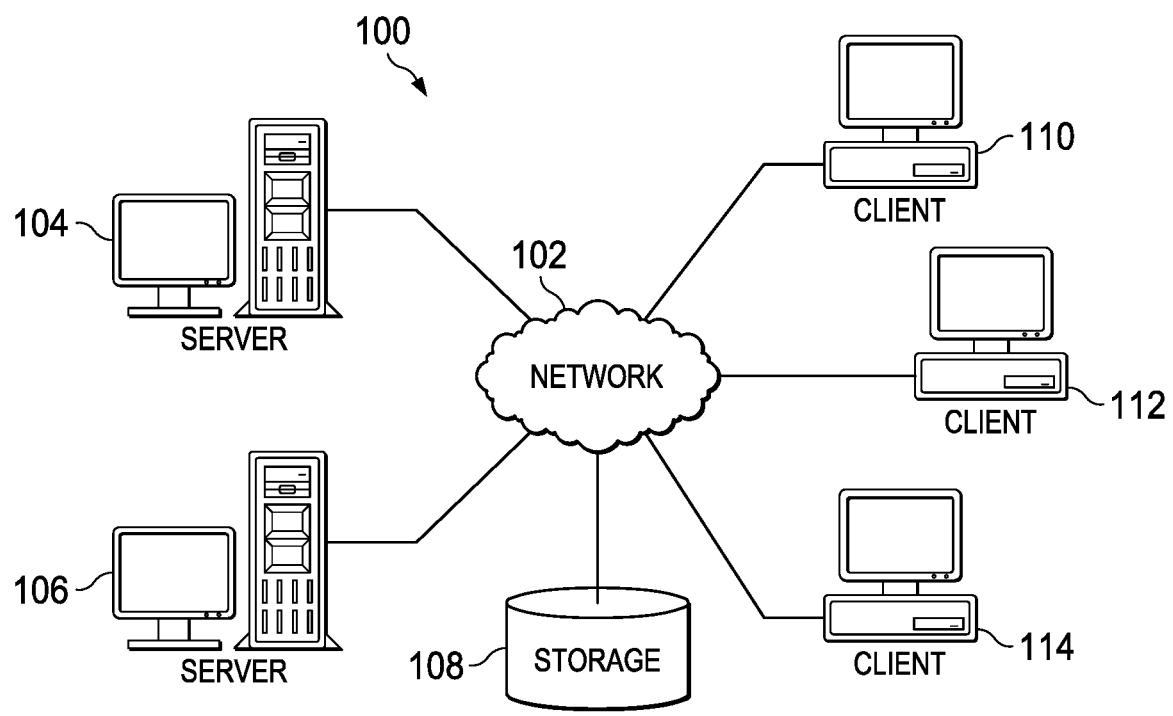
FIG. 1 is a pictorial representation of a network of data processing systems in which an illustrative embodiment may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer readable-storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, or any suitable combination of the foregoing devices. A computer-readable storage medium, as used herein, is not to be construed as being transitory signals, per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), or the connection may be made to an external computer for example, through the Internet using an Internet Service Provider. In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to the embodiments of the invention. It will be understood that each block of the flowchart illustrations and/or block diagrams, or combinations of blocks in the flowchart illustrations and/or block diagrams, can be implemented by computer-readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions or acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, or combinations of blocks in the block diagrams and/or flowchart illustrations, can be implemented by special purpose hardware-based systems that perform the specified functions or acts, or carry out combinations of special purpose hardware and computer instructions.

With reference now to the figures, and in particular, with reference to FIGS. 1-7, diagrams of data processing environments are provided in which illustrative embodiments may be implemented. It should be appreciated that FIGS. 1-7 are only meant as examples and are not intended to assert or imply any limitation with regard to the environments in which different embodiments may be implemented. Many modifications to the depicted environments may be made.

FIG. 1 depicts a pictorial representation of a network of data processing systems in which an illustrative embodiment may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 or server 106 may, for example, manage recovery of a customer workload after failure of a primary computing environment executing the customer workload. The failed primary computing environment may be, for example, a server or a set of servers in a data center environment or a cloud environment. Server 104 or server 106 also may generate a secondary virtual machine seed image storage at a secondary data processing site for the failure recovery. The configuration of the secondary data processing site is similar to the configuration of the primary data processing site.

Client 110, client 112, and client 114 also connect to network 102. Clients 110, 112, and 114 are clients of server 104 and/or server 106. Server 104 and server 106 may provide information, such as boot files, operating system images, virtual machine images, and software applications to clients 110, 112, and 114.

In this example, clients 110, 112, and 114 may each represent a different computing environment. A computing environment includes physical and software resources used to execute a set of one or more customer workloads or tasks. A computing environment may comprise, for example, one server, a rack of servers, a cluster of servers, such as a data center, a cloud of computers, such as a private cloud, a public cloud, a hybrid cloud, or any combination thereof. In addition, each of clients 110, 112, and 114 may be a primary data processing site or a secondary data processing site. A primary data processing site initially executes a customer workload using a set of primary virtual machines and images. A secondary data processing site executes the customer workload using a set of secondary virtual machines and seed images when one or more primary virtual machines fail while processing the customer workload at the primary data processing site.

Storage 108 is a network storage device capable of storing any type of data in a structured format or an unstructured format. The type of data stored in storage 108 may be, for example, a list of computing environments with corresponding available resources, a list of primary data processing sites, a list of secondary data processing sites, a list of customer workloads, a plurality of virtual machine images, and the like. Further, storage 108 may store other types of data, such as authentication or credential data that may include user names, passwords, or biometric data associated with system administrators, for example.

In addition, it should be noted that network data processing system 100 may include any number of additional servers, clients, storage devices, and other devices not shown. Program code located in network data processing system 100 may be stored on a computer-readable storage medium and downloaded to a computer or other data processing device for use. For example, program code may be stored on a computer-readable storage medium on server 104 and downloaded to client 110 over network 102 for use by client 110.

In the depicted example, network data processing system 100 may be implemented as a number of different types of communication networks, such as, for example, an internet, an intranet, a local area network (LAN), or a wide area network (WAN). FIG. 1 is intended as an example only, and not as an architectural limitation for the different illustrative embodiments.

Figure 2:
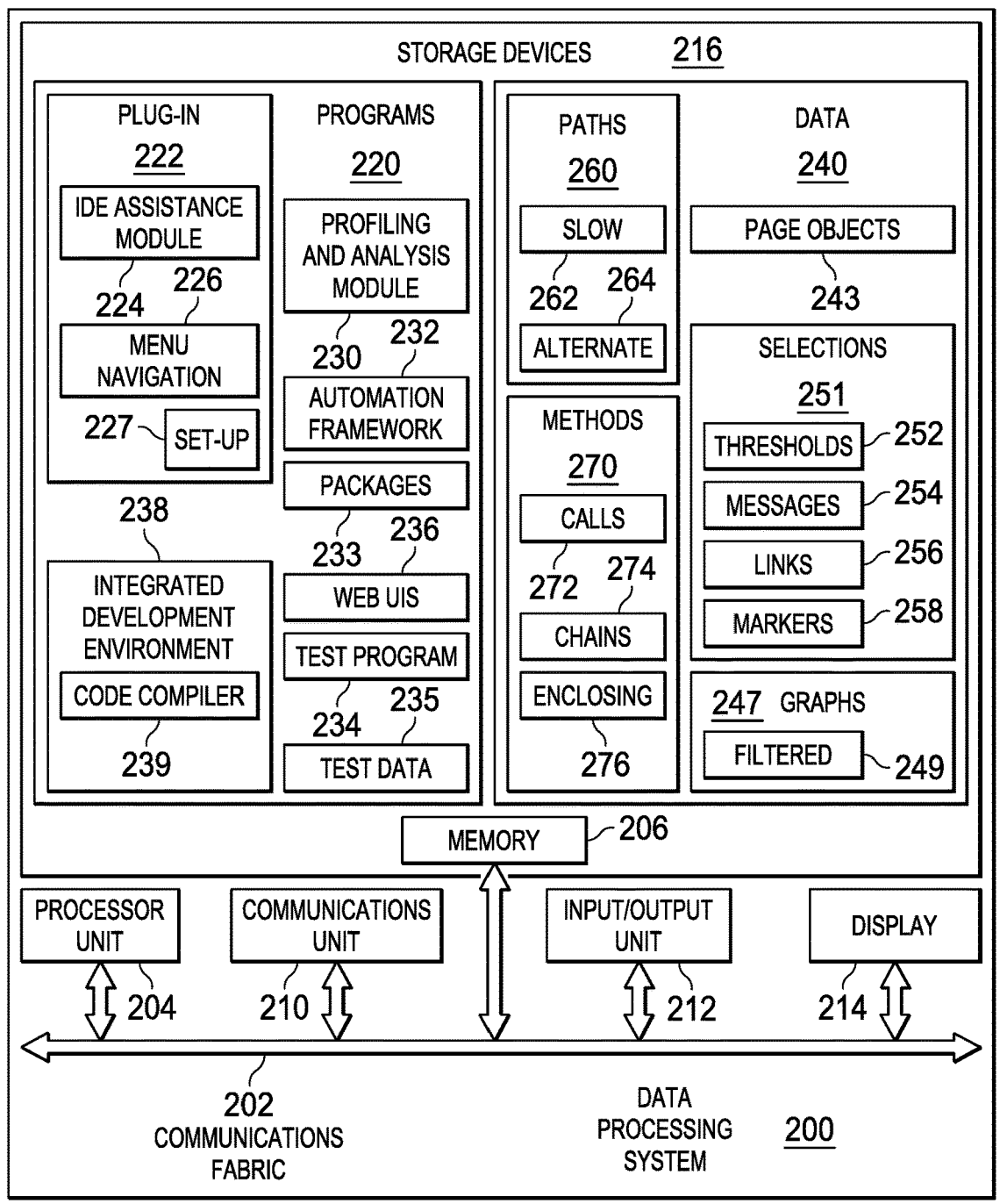
FIG. 2 is a diagram of a data processing system in which an illustrative embodiment may be implemented.

With reference now to FIG. 2, a diagram of a data processing system is depicted in accordance with an illustrative embodiment. Data processing system 200 is an example of a computer, such as server 104 in FIG. 1, in which computer-readable program code or instructions implementing processes of illustrative embodiments may be located. In this illustrative example, data processing system 200 includes communications fabric 202, which provides communications between processor unit 204, memory 206, persistent storage 208, communications unit 210, input/output unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer-readable storage device is any piece of hardware that is capable of storing information, such as, for example, without limitation, data, computer-readable program code in functional form, and/or other suitable types of information, either on a transient basis and/or a persistent basis. Further, a computer-readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory drive, a rewritable optical disk, a rewritable magnetic tape, or some combination of the above. The media used by persistent storage 208 may be removable. For example, a removable hard drive may be used for persistent storage 208.

In this example, persistent storage 208 stores programs 220 and data 240. Programs 220 may include plug-in 222, profiling and analysis module 230, automation framework 232, web user interfaces (WEB UIS) 236, code compiler 239 and test program 234.

Plug-in 222, in this example, may comprise IDE assistance module 224, menu navigation 226, and set-up 227. IDE assistance module 224 may be configured to assist a software engineer or developer to determine a better method call or call chain when writing code that has multiple method calls or call chains when writing code that has multiple method calls or call chains that achieve the same result. A better method call or method call chain may be a method call or method call chain with a faster execution time between a start point and an end point than the method call or method call chain being written by the software engineer or developer. IDE assistance module 224, individually or in conjunction with other programs, may be configured to assist a software engineer or developer to determine the best method call or call chain when writing code that has multiple method calls or call chains that achieve the same result. A best method call or method call chain may be a method call or method call chain with a fastest execution time between a start point and end point. In an illustrative embodiment, IDE assistance module 224 may provide software to execute the process for marking a slow path in accordance with an illustrative embodiment depicted in FIG. 5, the process for identifying a slow path and replacing the slow path with an alternate path in accordance with an illustrative embodiment depicted in FIG. 6, the process for identifying alternate paths and linking the alternate paths to a slow path in accordance with an illustrative embodiment depicted in FIG. 7, and the process for identifying slow paths and alternate paths using a filtered call graph depicted in FIG. 8. Plug-in 222 may generate markers in the integrated development environment (IDE), such as integrated development environment 238. Markers are generated in integrated development environment 238 when a developer or engineer codes a call to a method that has a performance below a preset threshold, such as a threshold stored in thresholds 252 of data 240. Plug-in 222 may provide for identification of slow and alternate paths in paths 260, and in filtered graphs in filtered 249 in graphs 247.

Menu navigation 226 may provide a software engineer or developer using plug-in 222 with the ability to navigate a menu in order to make selections in accordance with set-up 227. Set-up 227 provides selections, such as the selections in the process of FIG. 3. The selections in FIG. 3 may be stored in selections 251. Selections 251 may include thresholds 252, messages, 254, links 256, and markers 258.

Profiling and analysis module 230, in this example, stores performance results from previous performance test or profiling runs and feeds that information into integrated development environment 238 as the developer is coding. Performance data may be generated by test program 234 and stored in test data 235. Test data 235 may be analyzed by profiling and analysis module 230 to identify data for storage in graphs 247, paths 260, and methods 270. Methods 270 may include call 272, chains 274, and enclosing 276. Calls 272 may be method calls. Chains 272 may be method chains. Enclosing 276 may be enclosing methods employed by automation framework 232.

Automation framework 232, in this example, models each page or area of interaction on a web page as an object with the test code of test program 234. Automation framework 232 may be a framework such as a Selenium Automation Framework (SAF). Automation framework 232 may model each area of interaction on a web page as a Page Object within a test code of test program 234. A Page Object may be a class or object representing a web page interface to be tested, such as a web user interface stored in web UIS 236. A Page Object may wrap an HTML page, or fragment, with an application-specific interface, so that the programmer can manipulate page elements without getting involved in the HTML. In an illustrative example, Selenium Automation Framework (SAF) may provide for creating Page Objects for every page in a web page and every state that the web page can embody. Automation framework 232 may store Page Objects in page objects 243 in data 240. Packages 233 may contain one or more packages. A package may be, for example, a package that may be found at com.ibm.pageobjects.content and com.ibm.pageobjects.template.

Integrated development environment 238 may be a set of software tools to write and test software. Integrated development environment 238 may contain a code editor, a compiler, an interpreter, a debugger, tools to build automation, intelligent code completion, or other facilities that the developer may access through a single graphical user interface (GUI). Code compiler 239 may be a compiler or interpreter for integrated development environment 238. Code compiler 239, in this illustrative example, may be a number of computer programs configured to transform source code written in a programming language into another computer language, usually having a binary form known as object code.

Web UIS 236 in programs 220 may be one or more web user interfaces to be tested by test program 234. Testing by test program 234 may provide test data, such as test data 235. Test data 235 may be parsed by profiling and analysis module 230 to provide methods to provide paths 260 and methods 270. Plug-in 222 may analyze paths 260 and methods 270 to identify and store slow paths in slow 262 of paths 260, and to identify and store alternate paths in alternate 264 of paths 260. Plug-in 222 may analyze graphs 247 to identify filtered graphs and to store filtered graphs in filtered 249 of graphs 247.

Communications unit 210, in this example, provides for communication with other computers, data processing systems, or devices via a network, such as network 102 in FIG. 1. Communications unit 210 may provide communications through the use of, both physical and wireless, communications links. The physical communications link may utilize, for example, a wire, a cable, a universal serial bus, or any other physical technology to establish a physical communications link for data processing system 200. The wireless communications link may utilize, for example, shortwave, high frequency, ultra-high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer-usable program code, or computer-readable program code that may be read and run by a processor in processor unit 204. The program instructions in the different embodiments, may be embodied on different physical computer-readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer-readable media 244 form computer program product 246. In one example, computer-readable media 244 may be computer-readable storage media 248 or computer-readable signal media 250. Computer-readable storage media 248 may include, for example, an optical or magnetic disc that is inserted or placed into a drive or other device that is part of persistent storage 208 for transfer onto a storage device, such as a hard drive, that is part of persistent storage 208. Computer-readable storage media 248 also may take the form of a persistent storage, such as a hard drive, a thumb drive, or a flash memory that is connected to data processing system 200. In some instances, computer-readable storage media 248 may not be removable from data processing system 200.

Alternatively, program code 242 may be transferred to data processing system 200 using computer-readable signal media 250. Computer-readable signal media 250 may be, for example, a propagated data signal containing program code 242. For example, computer-readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 242 may be downloaded over a network to persistent storage 208 from another device or data processing system through computer-readable signal media 250 for use within data processing system 200. For instance, program code stored in a computer-readable storage media, such as computer-readable storage media 252, in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components, in addition to or in place of, those illustrated for data processing system 200. Other components shown in FIG. 2 can be varied from the illustrative examples shown. The different embodiments may be implemented using any hardware device or system capable of executing program code 242. As one example, data processing system 200 may include organic components integrated with inorganic components and/or may be comprised entirely of organic components, excluding a human being. For example, a storage device may be comprised of an organic semiconductor.

As another example, a computer-readable storage device in data processing system 200 is any hardware apparatus that may store data. Memory 206, persistent storage 208, and computer-readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as a cache found in an interface and memory controller hub that may be present in communications fabric 202.

It is understood that the illustrative embodiments are capable of being implemented in conjunction with any other type of computing environment now known or later developed.

Figure 3:
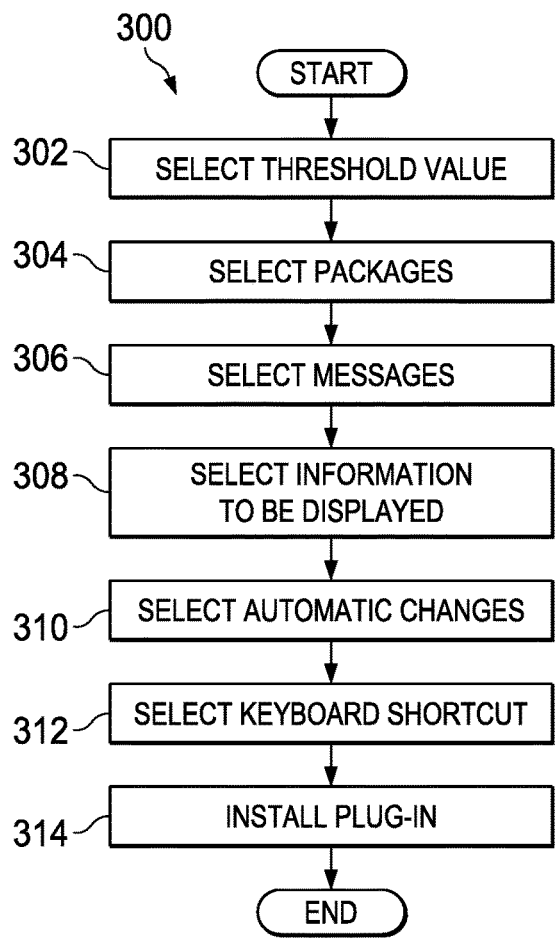
FIG. 3 is a flowchart illustrating a process for setting up and installing a plug-in application in accordance with an illustrative embodiment.

FIG. 3 depicts a flowchart illustrating a process for setting up and installing a plug-in application in accordance with an illustrative embodiment. Process 300 receives input from a graphical user interface, such as set-up 227 in FIG. 2. A developer or engineer selects a threshold value (step 302). The selected threshold may be stored in thresholds 252 in FIG. 2. A package is selected (step 304). In an illustrative example, the package may be a package stored in packages 233 in FIG. 2. One or messages are selected (step 306). A message may be one of messages 254 stored in data 240 in FIG. 2. A message may be a type of marker indicating a slow path. Information to be displayed with a marker is selected (step 308). Information may be performance data for a slow path and for alternate paths. Automatic changes are selected (step 310). Automatic changes will only be activated by selection. A non-selection acts to decline use of automatic changes. If selected, automatic changes will cause a faster path to be automatically substituted for a slow path, as the developer or engineer writes the code of the slow path. The developer or programmer may choose not to select automatic changes because the programmer may want to specifically test the slower path. In such a case, the programmer may use a keyboard shortcut to toggle the auto-substitution on and off. A keyboard shortcut is selected (step 312). The keyboard shortcut may allow a software engineer or developer to toggle back and forth between a selection of automatic changes and manual changes. After the selections have been made, the plug-in may be installed. The plug-in may be plug-in 222 in FIG. 2. After the selections are completed, plug-in 222, with data from paths 260, methods 270, and graphs 247, may identify slow paths for storage in slow 262 and alternate paths for storage in alternate 264 of paths 260.

Figure 4:
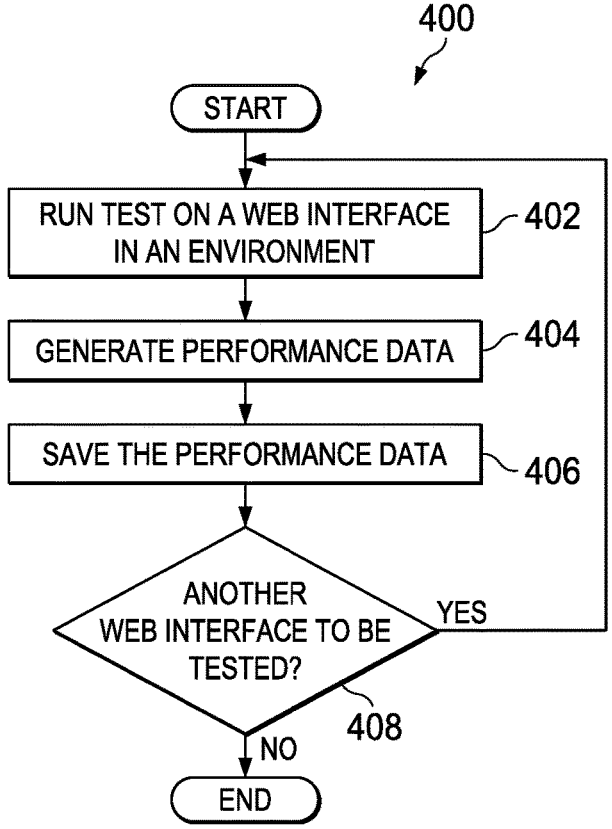
FIG. 4 is a flowchart illustrating a process for acquiring performance data in accordance with an illustrative embodiment.

FIG. 4 depicts a flowchart illustrating a process for acquiring performance data in accordance with an illustrative embodiment. Process 400 runs a test on a web interface in an environment (step 402). The test may be a test, such as test program 234 in FIG. 2. Performance data is generated (step 404). In an illustrative example, performance data may be a time value acquired from a code profiler, such as a code profiler in integrated development environment 238. In an illustrative embodiment, performance data may be generated by process 800 in FIG. 8. Performance data is saved (step 406). Performance data may be stored in in test data 235. Test data 235 may be parsed and analyzed to provide paths 260, graphs 247 and methods 270 in data 240 in FIG. 2. A determination is made if another web interface is to be tested (step 408). If there is another web interface to be tested, the process returns to step 402. If there is not another web interface to be tested, the process terminates thereafter.

Figure 5:
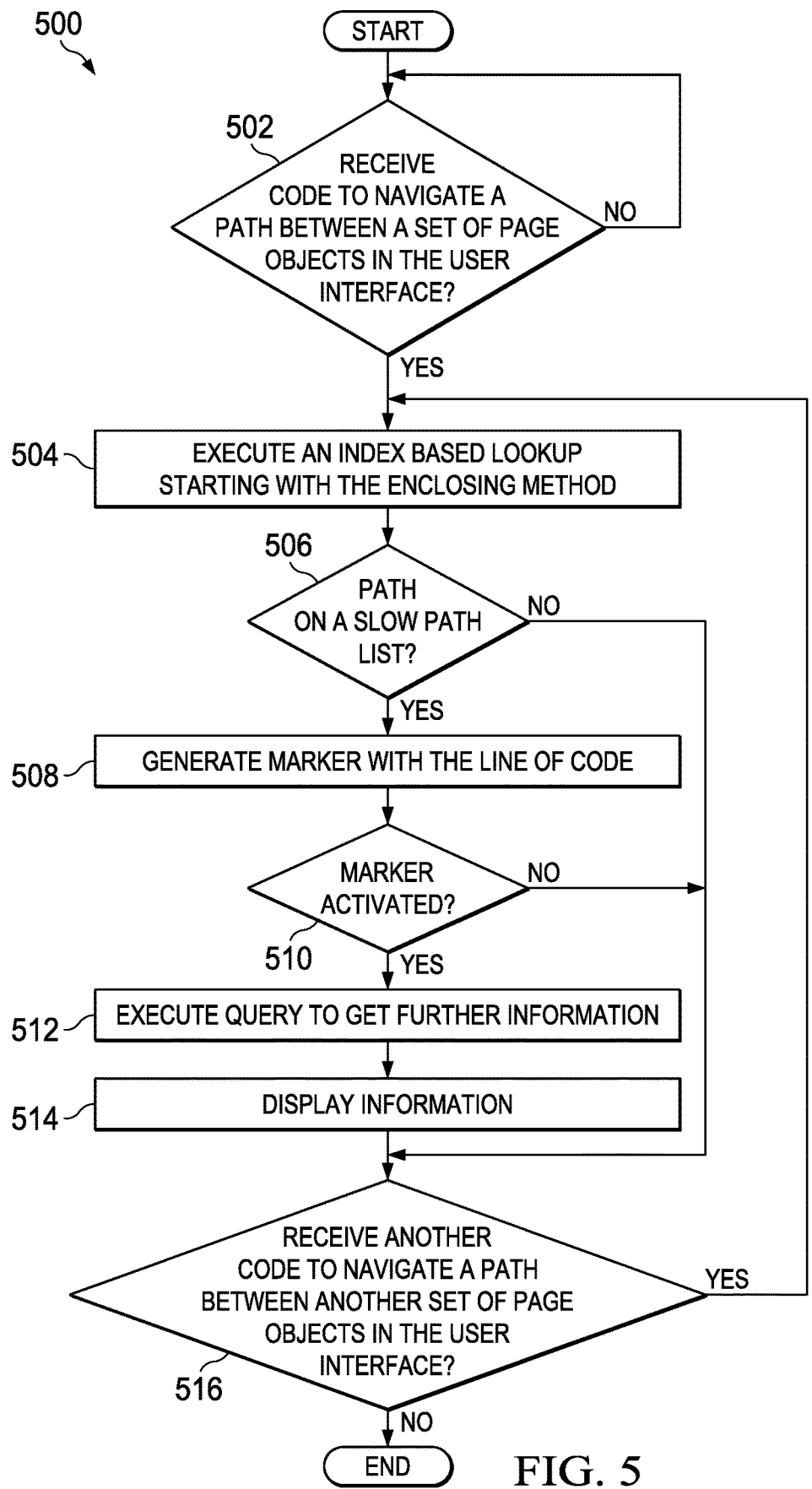
FIG. 5 is a flowchart illustrating a process for marking a slow path in accordance with an illustrative embodiment.

FIG. 5 depicts a flowchart illustrating a process for marking a slow path in accordance with an illustrative embodiment. Process 500 receives code to navigate a path between a set of page objects in the user interface (step 502). An index based lookup is executed starting with the enclosing method (step 504). A determination is made whether the path is on a slow path list (step 506). Responsive to the path being on a slow path list, process 500 generates a marker with the line of code (step 508). Displaying a marker with the line of code may include displaying a marker in proximity to the line of code. Displaying a marker with the line of code may include placing the marker over the line of code. The marker may be any marker known to persons skilled in the art including without limitation highlighting the code in a particular color. If the path is not on a slow path list, proceeds to step 516. After the marker has been generated with the line of code, a determination is made whether the marker has been activated (step 510). If the marker has been activated, process 500 executes a query to get further information (step 512) and displays the further information (step 514). If the marker has not been activated, the process proceeds to step 516. If another code is received to navigate a path between another set of page objects in the user interface (step 516), then the process returns to step 504, and if not, the process ends.

Figure 6:
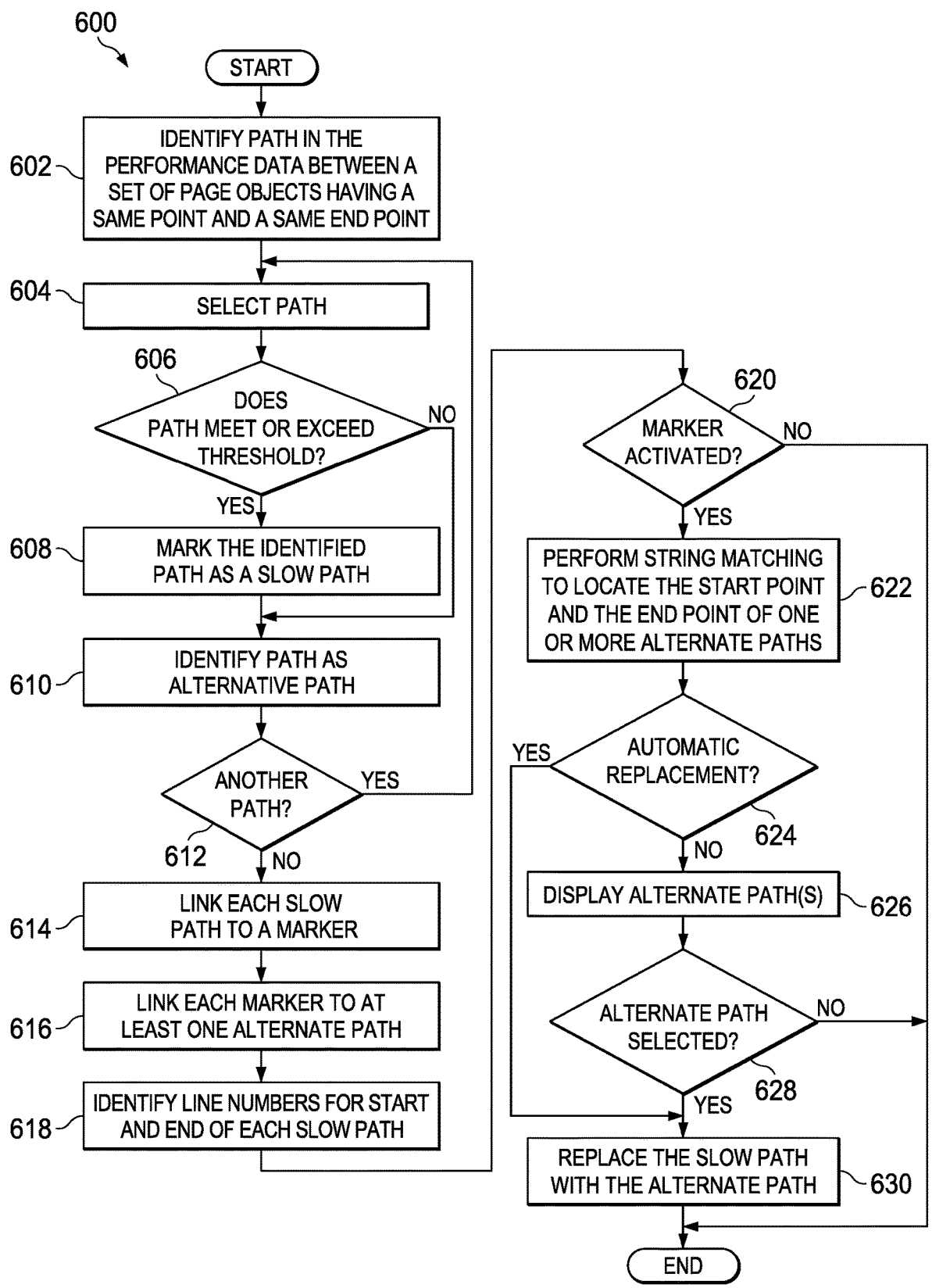
FIG. 6 is a flowchart illustrating a process for identifying a slow path and replacing the slow path with an alternate path in accordance with an illustrative embodiment.

FIG. 6 depicts a flowchart illustrating a process for identifying a slow path and replacing the slow path with an alternate path in accordance with an illustrative embodiment. Process 600 identifies paths in the performance data between a set of page objects having a same start point and a same end point (step 602). One of the paths is selected (step 604). A determination is made whether the path meets or exceeds a threshold (step 606). If the path meets or exceeds the threshold, the identified path is marked as a slow path (step 608). Paths marked as slow paths may be stored in slow 262 in FIG. 2. If the path does not meet or exceed the threshold, the process proceeds to step 610, and the path is marked as an alternative path (step 610). Paths marked as alternate paths may be stored in alternate 264 in FIG. 2. Next, a determination is made as to whether there is another path identified in step 612. If there is another path, the process goes to step 604 to select another path. If there is not another path to be examined, each slow path is line to a marker (step 614). Markers may be markers stored in markers 258 in FIG. 2. Each marker is linked to at least one alternate path (step 616). Links may be links stored in links 256 of FIG. 2. Alternate paths are paths that have call methods or call chains that do not meet or exceed the threshold. Line numbers for the start and end of each slow path are identified (step 618). A determination is made as to whether a marker has been activated (step 620). If the marker has not been activated, the process ends. If the marker has been activated, string matching is performed to locate the start point and the end point of one or more alternate paths (step 622). A determination is made as to whether automatic replacement has been selected (step 624). If automatic replacement has not been selected, then alternate paths will be displayed (step 626) and a determination made as to whether an alternate path has been selected (step 628). If an alternate path has been selected, then the slow path will be replaced with the selected alternate path (step 630). If an alternate path is not selected, the process terminates. If at step 624, a determination is made that automatic replacement has been selected, then the slow path will be replaced with the alternate path (step 630).

Figure 7:
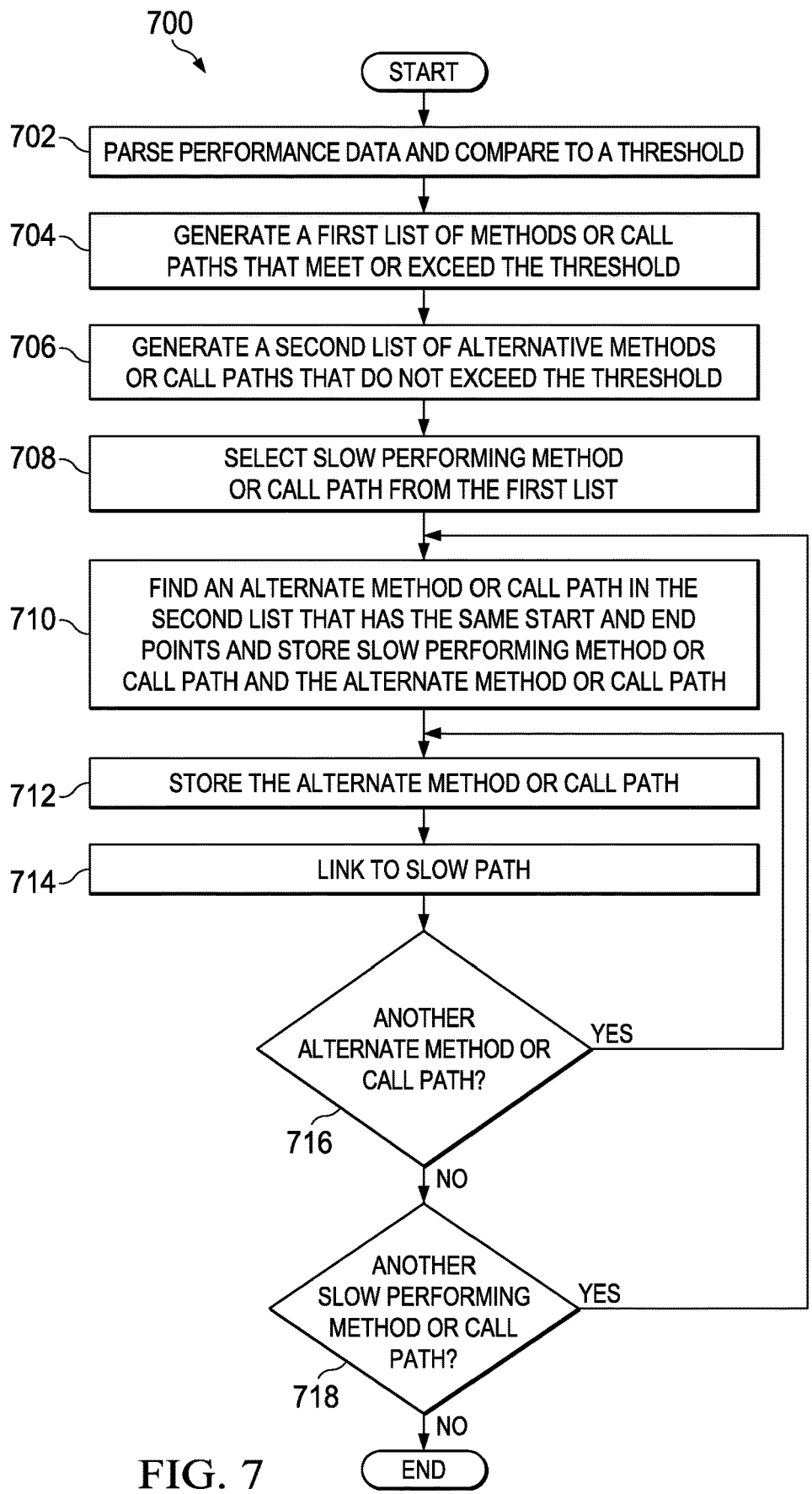
FIG. 7 is a flowchart illustrating a process for identifying alternate paths and linking the alternate paths to a slow path in accordance with an illustrative embodiment.

FIG. 7 depicts a flowchart illustrating a process for identifying alternate paths and linking the alternate paths to a slow path in accordance with an illustrative embodiment. Process 700 starts and parses performance data and compares the parsed data to a threshold (step 702). Parsing of the performance data and comparing the parsed data to a threshold may be performed by plug-in 222 in FIG. 2. A first list of methods or call paths that meet or exceed the threshold is generated (step 704). A second list of alternative methods or call paths that do not exceed the threshold is generated (step 706). A slow performing method or call path is selected from the first list (step 708). An alternate method or call path in the second list is found that has the same start and end points and the slow performing method or call path is stored with the alternate method or call path (step 710). The alternate method or call path is stored (step 712). The alternate method or call path may be stored in alternate 264 of paths 260 in FIG. 2. The alternate method or call path from step 712 is linked to the slow performing method or call path (step 714). A link may be a link from links 256 in FIG. 2. A determination is made as to whether there is another alternate method or call path (step 716). If there is another alternate method or call path, the process goes to step 712. If there is not another alternate method or call path, the process determines whether there is another slow performing method or call path (step 718). If there is another slow performing method or call path, the process goes to step 710. If not. The process ends.

Figure 8:
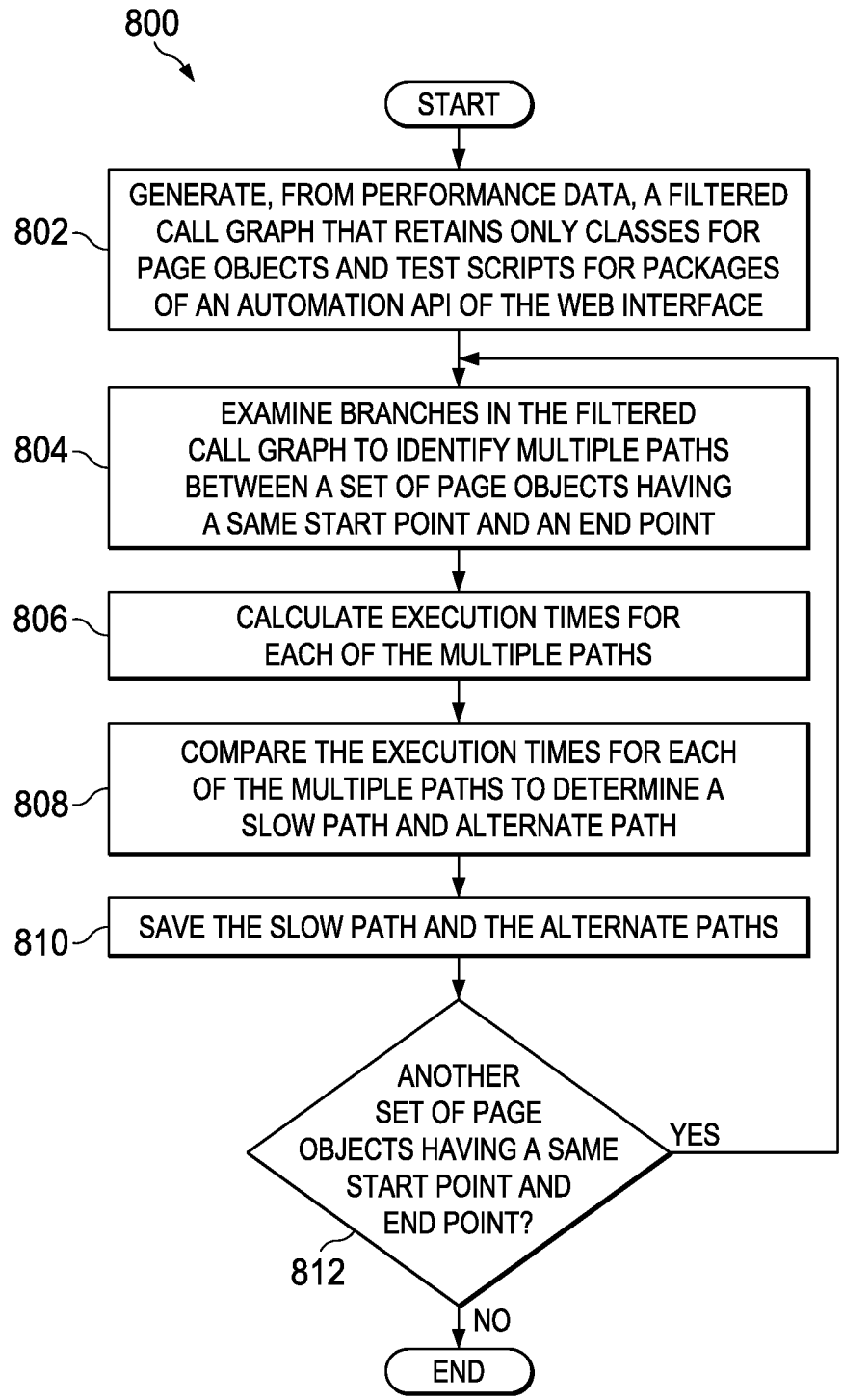
FIG. 8 is a flowchart illustrating a process for identifying slow paths and alternate paths using a filtered call graph in accordance with an illustrative embodiment.

FIG. 8 depicts a flowchart illustrating a process for identifying slow paths and alternate paths using a filtered call graph. Process 800 starts and generates, from performance data, such as test data 235 in FIG. 2, a filtered call graph that retains only classes for page objects and test scripts for packages of an automation API of the web interface (step 802). Filtered call graph generated by process 800 may be stored in filtered 249 of graphs 247 in FIG. 2. Branches in the filtered call graph are examined to identify multiple paths between a set of page objects having a same start point and a same end point (step 804). Execution times are calculated for each of the multiple paths (step 806). The execution times for each of the multiple paths are compared to determine a slow path and an alternate path (step 808). The slow path and the alternate paths are saved (step 810). A determination is made as to whether there is another set of page objects having a same start point and a same end point (step 812). If there is another set of page objects having a same start point and a same end point, the process goes to step 804. If not, the process ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed herein.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, or combinations of blocks in the block diagrams and/or flowchart illustrations, can be implemented by special purpose hardware-based systems that perform the specified functions or acts, or combinations of special purpose hardware and computer instructions.

What is claimed is:

1. A method for improved testing of a web user interface where each page and point of interaction in the web user interface is represented by a Page Object, the method comprising:

responsive to a processor receiving code to navigate a path from a first Page Object to a second Page Object in the web user interface, identifying a slow path between the first Page Object and the second Page Object that meets or exceeds a threshold and identifying a second path between the first Page Object and the second Page Object that does not meet or exceed the threshold;

responsive to identifying the slow path, execute a process for marking the slow path and replacing the slow path with the second path; and navigating the path from the first Page Object to the second Page Object in the web user interface using the second path in order to test the web user interface.

2. The method of claim 1, further comprising:
linking the slow path to a marker;
linking the marker to the second path; and
responsive to an activation of the marker, displaying the second path with the code for the slow path.

3. The method of claim 2, further comprising:
running a test on the web user interface in an environment to generate data; and
saving the data, wherein the data is performance data generated by a code compiler.

4. The method of claim 3, further comprising:
using the data, generating a filtered call graph, wherein the filtered call graph retains only classes for the Page Objects and for test scripts for packages of an automation API of the web user interface;
examining branches in the filtered call graph to identify multiple paths from the first Page Object to the Second Page Object, wherein each of the multiple paths has a start point and an end point;
calculating execution times for each of the multiple paths; and
comparing the execution times for each of the multiple paths to determine the slow path.

5. The method of claim 2, further comprising:
identifying line numbers for a start and an end of the second path; and
responsive to the activation of the marker, performing string matching to locate the start and the end of the second path.

6. The method of claim 1, further comprising:
selecting a criteria; and
responsive to selecting the criteria, identifying a threshold.

7. The method of claim 6, wherein the threshold is a time of execution measured by a code compiler.

8. A computer system for improved testing of a web user interface where each page and point of interaction in the web user interface is represented by a Page Object, the computer system comprising:
a bus system;
a storage device connected to the bus system, wherein the storage device stores program instructions;
a processor connected to the bus system, wherein a processor executes the program instructions to:
responsive to the processor receiving code to navigate a path from a first Page Object to a second Page Object in the web user interface, identify a slow path between the first Page Object and the second Page Object that meets or exceeds a threshold and identifying a second path between the first Page Object and the second Page Object that does not meet or exceed the threshold;
responsive to identifying the slow path, execute a process for marking the slow path and replacing the slow path with the second path; and
navigating the path from the first Page Object to the second Page Object in the web user interface using the second path in order to test the web user interface.

9. The computer system of claim 8, wherein the processor further executes the program instructions to:
link the slow path to a marker;
link the marker to the second path; and
responsive to an activation of the marker, display the second path with the code for the slow path.

10. The computer system of claim 9, wherein the processor further executes the program instructions to:
run a test on the web user interface in an environment to generate data; and
save the data, wherein the data is performance data generated by a code compiler.

11. The computer system of claim 10, wherein the processor further executes the program instructions to:
using the data, generate a filtered call graph, wherein the filtered call graph retains only classes for Page Objects and for test scripts for packages of an automation API of the web user interface;
examine branches in the filtered call graph to identify multiple paths from the first Page Object to the Second Page Object, wherein each of the multiple paths have a start point and an end point;
calculate execution times for each of the multiple paths; and
compare the execution times for each of the multiple paths to determine the slow path.

12. The computer system of claim 8, wherein the processor further executes the program instructions to:
select a criteria; and
responsive to selecting the criteria, identify a threshold.

13. The computer system of claim 12, wherein the threshold is a time of execution measured by a code compiler.

14. The computer system of claim 8, wherein the processor further executes the program instructions to identify line numbers for a start and an end of the second path; and
responsive to the activation of the marker, perform string matching to locate the start and the end of the second path.

15. A computer program product for improved testing of a web user interface where each page and point of interaction in the web user interface is represented by a Page Object, the computer program product comprising a computer-readable storage medium having program instructions executable by a computer to cause the computer to perform a method comprising:
responsive to a processor receiving code to navigate a path from a first Page Object to a second Page Object in the web user interface, identifying a slow path between the first Page Object and the second Page Object that meets or exceeds a threshold and identifying a second path between the first Page Object and the second Page Object that does not meet or exceed the threshold;
responsive to identifying the slow path, execute a process for marking the slow path and replacing the slow path with the second path; and
navigating the path from the first Page Object to the second Page Object in the web user interface using the second path in order to test the web user interface.

16. The computer program product of claim 15, wherein the program instructions further comprise:
linking the slow path to a marker;
linking the marker to the second path; and
responsive to an activation of the marker, displaying the second path with code for the slow path.

17. The computer program product of claim 16, wherein the program instructions further comprise:
identifying line numbers for a start and an end of the second path; and
responsive to the activation of the marker, performing string matching to locate the start and the end of the second path.

18. The computer program product of claim 15, wherein the program instructions further comprise:
selecting a criteria; and
responsive to selecting the criteria, identifying a threshold.

19. The computer program product of claim 18, wherein the program instructions further comprise:
- running a test on the web user interface in an environment to generate data;
- saving the data;
- using the data, generating a filtered call graph, wherein the filtered call graph retains only classes for Page Objects and for test scripts for packages of an automation API of the web user interface;
- examining branches in the filtered call graph to identify multiple paths from the first Page Object to the Second Page Object, wherein each of the multiple paths have a start point and an end point;
- calculating execution times for each of the multiple paths; and
- comparing the execution times for each of the multiple paths to determine the slow path.

* * * * *